United States Patent
Castagna et al.

(10) Patent No.: US 8,767,290 B2
(45) Date of Patent: Jul. 1, 2014

(54) ELECTRICALLY PUMPED LATERAL EMISSION ELECTROLUMINESCENT DEVICE INTEGRATED IN A PASSIVE WAVEGUIDE TO GENERATE LIGHT OR AMPLIFY A LIGHT SIGNAL AND FABRICATION PROCESS

(75) Inventors: Maria Eloisa Castagna, Catania (IT); Anna Muscara', Patti (IT)

(73) Assignee: STMicroelectronics S.R.L., Agrate Brianza (MB) (IT)

( * ) Notice: Subject to any disclaimer, the term of this patent is extended or adjusted under 35 U.S.C. 154(b) by 632 days.

(21) Appl. No.: 12/949,412

(22) Filed: Nov. 18, 2010

(65) Prior Publication Data

US 2011/0122485 A1    May 26, 2011

(30) Foreign Application Priority Data

Nov. 19, 2009   (IT) .................................. VA09A0070

(51) Int. Cl.
*H01S 5/00*   (2006.01)
(52) U.S. Cl.
USPC .......................................................... 359/344
(58) Field of Classification Search
USPC .......................................................... 359/344
See application file for complete search history.

(56) References Cited

U.S. PATENT DOCUMENTS

| | | | |
|---|---|---|---|
| 7,471,859 B2 * | 12/2008 | Levner et al. ................... | 385/37 |
| 2004/0106285 A1 | 6/2004 | Zacharias ................... | 438/689 |
| 2004/0252738 A1 * | 12/2004 | Hill .................................. | 372/43 |
| 2005/0111079 A1 * | 5/2005 | Wang et al. ................... | 359/344 |
| 2006/0284200 A1 * | 12/2006 | Coffa et al. ..................... | 257/98 |
| 2009/0015906 A1 * | 1/2009 | Kimerling et al. ......... | 359/341.5 |
| 2010/0091358 A1 * | 4/2010 | Kimerling et al. ............ | 359/344 |
| 2010/0140755 A1 * | 6/2010 | Atanackovic ................. | 257/632 |
| 2010/0151603 A1 * | 6/2010 | Castagna et al. ............... | 438/29 |

OTHER PUBLICATIONS

Barrios et al., "Electrically driven silicon resonant light emitting device based on slot-waveguide", Optics Express, vol. 14, No. 25, Dec. 2005, pp. 10092-10101.
Preston et al., "Slot waveguides with polycrystalline silicon for electrical injection", Optics Express, vol. 17, No. 3, Jan. 2009, pp. 1527-1534.
Shin et al., "Recent advances in nanocrystal-Si sensitized, Er-doped silica waveguide amplifiers", Optical Fiber Communications Conference Technical Digest, vol. 3, Mar. 2005, pp. 107-109.

* cited by examiner

*Primary Examiner* — Eric Bolda
(74) *Attorney, Agent, or Firm* — Allen, Dyer, Doppelt, Milbrath & Gilchrist, P.A.

(57) ABSTRACT

An electrically pumped lateral emission electroluminescent device may include a slotted waveguide including a top silicon layer having a thickness between 150 nm and 300 nm and a refraction index associated therewith, and a bottom silicon layer having a thickness between 150 nm and 300 nm and a refraction index associated therewith. A core layer may include silicon oxide between the top and bottom layers and a thickness less than 70 nm. A core layer refraction index may be greater than each of the top and bottom layer refraction indices. A core layer portion may be in a direction of light propagation and may be doped with erbium, and may include silicon nanocrystals. A portion of each of the top and bottom layers may coincide with the core layer portion and may be doped so that the top and bottom layer portions are electrically conductive to define top and bottom plates.

11 Claims, 11 Drawing Sheets

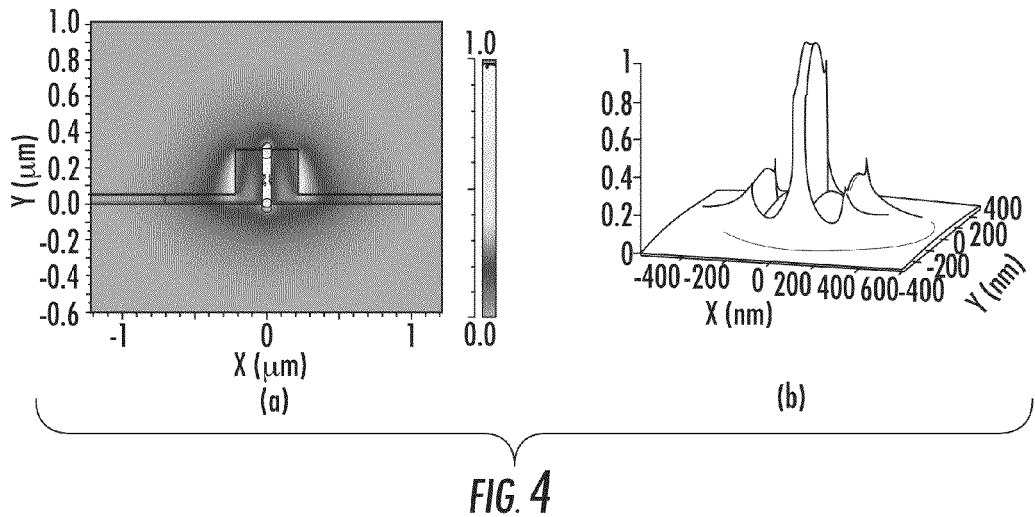
FIG. 4
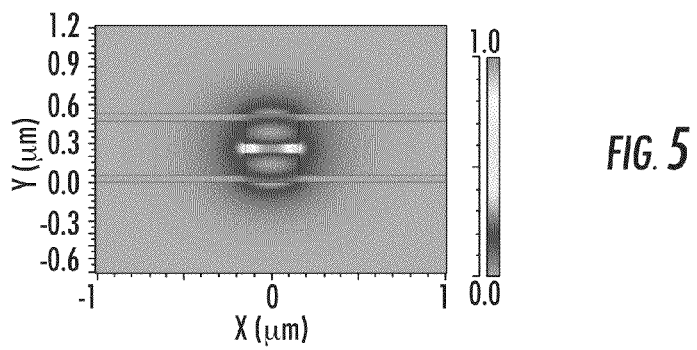
FIG. 5
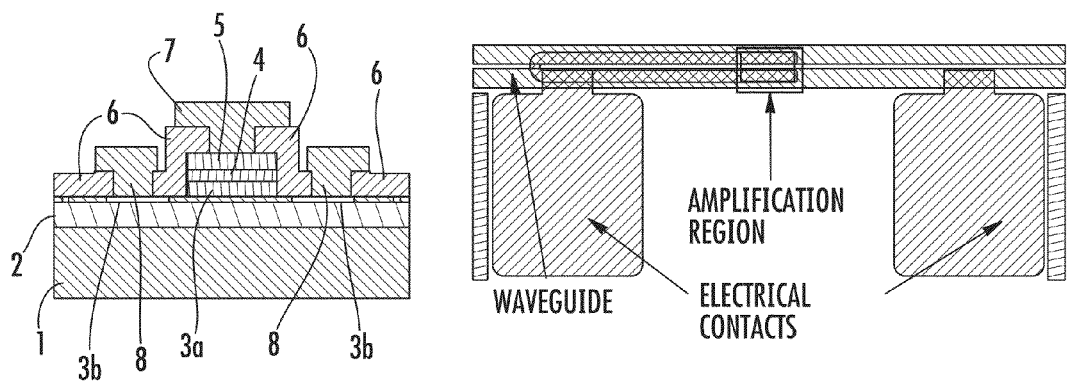
FIG. 6
FIG. 7

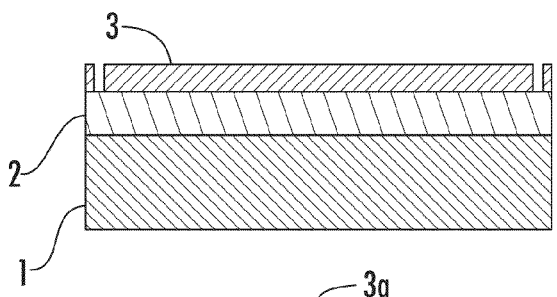
FIG. 17
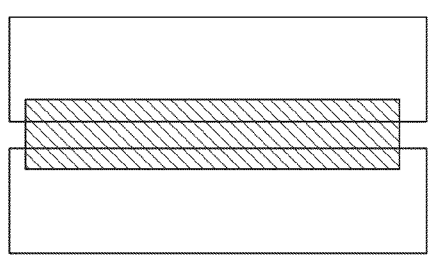
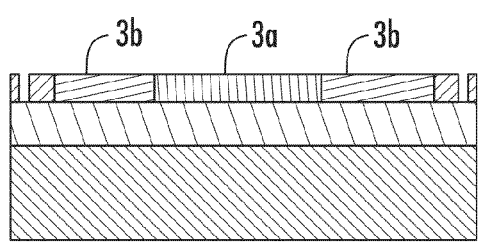
FIG. 18
FIG. 19
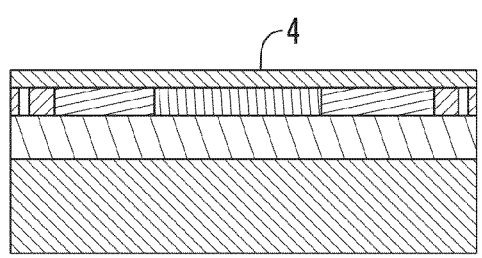
FIG. 20
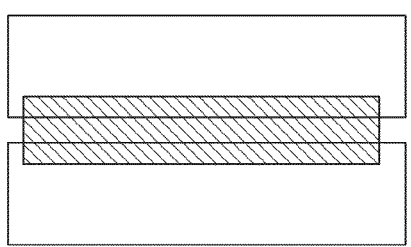
FIG. 21

ELECTRICALLY PUMPED LATERAL EMISSION ELECTROLUMINESCENT DEVICE INTEGRATED IN A PASSIVE WAVEGUIDE TO GENERATE LIGHT OR AMPLIFY A LIGHT SIGNAL AND FABRICATION PROCESS

FIELD OF INVENTION

This invention relates, in general, to the integration of light emitting devices in silicon waveguides for optical signal. This invention also relates to optical waveguide amplifiers that may be integrated in common IC fabrication processes and electrically pumped.

BACKGROUND OF THE INVENTION

Based upon technological advances in silicon based microelectronics, integration scales have been reached such that in a 1 cm$^2$ silicon chip there may be billions of transistors and up to 10 km of metal connections. Signal propagation delays, because of parasitic resistors and capacitors (RC) among metal lines and intermetal dielectrics, poses the problem of achieving ever faster signal transmission with relatively small losses. A possible approach is to use optical signal transmission paths. In this way, the signal propagation speed is that of light in the optical medium, e.g. silicon oxide. Moreover a plurality of signals may be simultaneously transmitted through a single optical guide. Although silicon waveguides have a relatively large absorption due to free carriers that at 1.55 µm implies losses of several dB/cm for mono-modal waveguides, they are promising candidates for systems that could be electrically pumped, such as modulators, amplifiers, and the like.

In the field of integrated optics, light emitting devices have numerous applications for generating and conveying optical signals through a passive waveguide of an integrated device, and eventually for distributing the optical signal through splitters to several functional circuit blocks of a system-on-chip device.

Another device is the optical amplifier for compensating losses due to passive components (for example, splitters, and waveguides) and for pre-amplifying the signal for active components like detectors. As Erbium (Er) Doped Fiber Amplifiers (EDFA) are usually employed for communications over long distances, on the same working principle, integrated waveguide amplifiers, for example, have also been studied (Erbium-Doped Waveguide Amplifiers (EDWA)), and An EDFA may be optically pumped, and there is a vast literature on optically pumped EDWAs.

FIG. 1 is an exemplary hybrid system for pumping silicon optical amplifiers. The LED III-V is located inside a trench formed in the silicon substrate to optically pump the Erbium doped waveguide optical amplifier. In a host optical material, Erbium assumes the status of trivalent ion Er3+ with an electronic configuration [Xe]4f$^{11}$ A schematic representation of the energy levels of Erbium is shown in FIG. 2. The characteristic wavelength of the transitions among levels are less sensitive to the host lattice (despite it causing the splitting of each degenerated level by the Stark effect) because the 4f shell is relatively strongly shielded by the other, more external, orbits may be completely occupied.

Optical amplification is based on the stimulated emission of an excited Erbium atom hit by a photon of an appropriate wavelength. Indeed, the transition $4I_{13/2} \rightarrow 4I_{15/2}$ corresponds to the emission of a photon of $\lambda$=1.54 µm. As a result, an atom of Erbium in the excited state ($4I_{13/2}$) decays to the main state ($4I_{15/2}$) when hit by a photon of $\lambda$=1.54 µm, emitting a second identical photon. In this way, the initial signal is amplified.

Erbium excitation usually takes places by optical pumping: a photon of wavelength $\lambda$=0.98 µm, provided by a laser, is absorbed by an Erbium atom that, in this way, goes from the main state ($4I_{15/2}$) to the second excited state ($4I_{11/2}$), that has a very short mean life. From this state, the atom decays rapidly towards the more stable state $4I_{13/2}$, in which it remains for a relatively long time, sufficient to be hit by a photon at 1.54 µm (signal).

Nevertheless, the excitation cross-section of Erbium in a host matrix oxide is relatively low ($10^{-21}$ cm$^2$). Another optical system is that of forming Si nanocrystals in an oxide matrix and incorporating therein, Erbium ions. By doping oxide rich of silicon nanocrystals (silicon rich oxide or SRO), with Erbium a strong emission at 1.54 µm may be measured that is mediated by a process of direct energy transfer between the Si nanocrystal and the Erbium ion.

Silicon nanocrystals (Nc) efficiently transfer energy to the Er$^{3+}$ ions by increasing the effective optical cross-section of Er up to $10^{-16}$ cm$^2$. Moreover, solubility of Erbium is greater in silicon oxide than in crystalline silicon, and non radiating processes are suppressed because of the enlargement of the forbidden band in nanocrystals.

If a photon is absorbed by the Nc, an exciton is generated within the Mc itself. This exciton may recombine radiatively by emitting a photon with an energy that depends on the size of the Nc. If an Erbium ion is relatively close to the Nc, the exciton may non-radiatively recombine within the Nc and transfer its energy to the ion. A possible excitation model is depicted in FIG. 3.

Excitation takes place when two Erbium atoms that are at the level $4I_{13/2}$ combine their energies such that one of them decays to the main state ($4I_{15/2}$) while the other is promoted to the state $4I_{9/2}$. Thus, because of this event, two atoms leave the level $4I_{13/2}$ without having given their contribution in terms of optical amplification.

An optically generated exciton (i), confined in the nanocrystal, gives up its energy (ii) to the Erbium ion. Then an electron of the Erbium atom is promoted to an unspecified excited state (iii) and decays towards the meta-stable state $4I_{13/2}$ see, for example, Polman and F. van Veggel, J. Opt Soc. Am B 21, 871 (2006), and A. J. Kenyon, C. E. Chryssou, C. W. Pitt, T. Shimizu-Iwayama, D. E. Hole, No. Sharma, C. J. Humphreys, Luminescence from erbium-doped silicon nanocrystals in silica: Excitation mechanisms, journal of applied physics volume 91, number 1, 1 January 2002.

Thus, either an emission (vi) of a photon at 1.54 µm or an upward conversion may occur, where by a further interaction with an excited nanocrystal, the excited atom passes from the metastable state $4I_{13/2}$ to a higher level (v) (See Kik, P. G., and Polman, A., J. Apl. Phys. (2002) 91 (1), 534). As it may be inferred from the scheme of FIG. 3, the system presents four levels: two related to the nanocrystal immersed in the oxide array and two related to the Erbium ion. As may be known, in such a system, inversion of population is more likely to be achieved. The literature reports attainment of a net gain in a waveguide amplifier made of SRO+Er (EDWA) by optical pumping; See for example, Han, H.-S., et al., Appl. Phys. Lett. (2002) 81 (20), 3720 and Kik, P. G., and Polman, A., J. Appl. Phys. (2002) 91 (1), 534.

Usually, in waveguide optical amplifiers, light is guided in a core material of higher refraction index than adjacent media, for example, a silicon core and a silicon oxide cladding or mantel. Recently, a type of waveguide, called "slot waveguide," has been developed by introducing a thin layer of a relatively low refraction index material, typically SRO+Er, between two silicon layers of high refraction index. A characteristic of this type of waveguide is to focus the electric field in the region of lower refraction index. FIG. 4 shows the working scheme of a vertical "slot waveguide" (a) and the transversal electric optical mode that is confined in the slot (b) (See, for example, C. Barrios and M. Lipson, Optics Express 13 (25), 10092 (2007)).

The physical effect that allows guiding of light inside a waveguide is the total internal reflection that allows the creation of particular states, the "guided modes". Thus a guided mode is a state allowed inside the considered guiding structure. To calculate the guided modes, the field is assumed to be a planar transversal monochromatic electromagnetic waveform, and appropriate boundary conditions are imposed.

Also, the distribution of the electromagnetic field is conditioned by geometric, structural and physical characteristics of the waveguide. The fields, internal and external to the waveguide, may be found by solving Maxwell's equations. Outside the thin layer of the low refraction index of the guide, the electromagnetic field is evanescent. The extinction coefficient of the mode has a smaller value for the modes that propagate in materials of higher refraction index. The largest the refraction index, the more the evanescent mode propagates outside.

In a "slot waveguide", the two layers of high refraction index, compared to the lower refraction index of the thin silicon core layer, are close enough to each other that the evanescent fields that propagate in the two layers of high refraction index add up together, which enhances the confinement of the electromagnetic field. In fact, such an effect of enhanced confinement is typically not observed in "slot" waveguides for silicon core thicknesses exceeding the reciprocal of the extinction coefficient of the guiding silicon oxide layers. In horizontal confinement structures, as represented in FIG. 5, it is the transversal magneto-optic mode that is confined. For the specific function of a waveguide, the advantage of concentrating the electromagnetic field in relatively very thin layers having a relatively low refraction index is to reduce light transmission losses because of absorption along the waveguide.

SUMMARY OF THE INVENTION

An integrated electrically pumped light emitting device, otherwise definable as an electroluminescent device, within a passive, undoped low-loss waveguide for optical interconnections in the same chip or among distinct chips may be provided. The light emitting device, directly integrated in the passive waveguide, addresses coupling problems of the emitting device with the signal conveying/distributing passive waveguide. The structure allows generation of an optical signal directly in the guide, and thus may avoid coupling losses as occurring in side emission devices III-V, coupled to silicon oxide waveguides. Indeed, such coupling losses have so far limited the development of optical interconnections.

The device may be used for generating an optical transversal mode (TM) polarized signal, typically at 1.54 μm, in the waveguide itself, which may even be used for generating and distributing clock signals within the chip. With particular expedients in integrating the electrically pumped device in a common IC fabrication process, substantially of CMOS type, the active structure of this disclosure may even work as an amplifier of an optical signal already present in the passive waveguide within which the structure is integrated.

To obtain these results, it may be desirable that techniques and doping conditions used for forming the structure be such to produce the required inversion of the population of the optically-active dopant ions, e.g. of Erbium, in the active region created in the passive waveguide. Moreover, it may be desirable that the electrical field applied for pumping be precisely balanced and not imply significant losses. If these conditions are met the device may attain a net gain. Even when using the device for amplifying an optical signal, the structure of the integrated optically active device in a passive waveguide reduces coupling losses.

Considering that the modal gain of a fiber or waveguide optical amplifier is directly proportional to the modal confinement of the guiding structure, by confining the mode inside a thin layer of oxide or nitride, rich of silicon nanocrystals (SRO), doped with Erbium that is implanted through the opening of a common implant photomask in an optically active portion of the thin silicon oxide (or nitride) core layer of a slot waveguide having a relatively low refraction index and keeping the losses sufficiently small, a net gain is obtained. Thus, an optical waveguide amplifier integrable on a silicon chip is formed.

Such a of "slot" waveguide formed with an active layer of oxide or of silicon nitride, including silicon nanocrystals (SRO), of particularly small thickness (≤70 nm and preferably ≤50 nm), between layers of higher refraction index of undoped amorphous or polycrystalline silicon (polysilicon) is generally compatible with common CMOS integration technology. For the formatting of the electroluminescent waveguide device to an optically active portion of SRO doped with Erbium, locally doped portions of the two silicon layers of relatively high refraction index are also similarly associated, such to locally confer the silicon an appropriate electrical conductivity, forming the two plates of a typical MOS structure, electrically coupled to the opposite surfaces of the optically active portion doped with Erbium (SRO+Er) of the thin core layer. By applying a voltage on the two plates of the MOS structures it is possible to force an electric current through the thin optically active portion of the core doped with Erbium (SRO+Er), effectively electrically pumping the so composed electroluminescent device.

A extraordinary strong interaction between the electro-optic active media and the electromagnetic field is conveyed through the waveguide by virtue of the high confinement factor in the thin low refraction index region and reduction of losses along the guiding structure of an optical signal. By properly choosing the doping and the thermal budget, and the structure of coupled plates of a MOS structure, an optical signal that propagates in the waveguide and that may be used as a clock signal is generated. Generally only the electro-optically active portion or region of the optically active layer of low refraction index of the slot waveguide is doped with Erbium reducing absorption losses of Erbium ions, and leaving undoped passive portions of the guiding structure. The device may even function as an electrically pumped optical amplifier of a signal propagated in the passive guide provided that the Erbium concentration and distribution is adapted to inversion of the ion population and losses kept sufficiently small not to jeopardize a net gain of the electrically pumped device.

Erbium may be implanted with a fluence adapted to produce a distribution of doping atoms in the thin optically active material of low refractive index of the waveguide, either as much similar as possible to a Gaussian shape, in which the center of the Gaussian is positioned half-way of the thickness of the optically active medium, or by carrying out multiple implant steps such to obtain the most uniform concentration as possible through the thickness of the optically active film in the portion of the passive waveguide, in which the electrically pumped active structure is formed. The choice may depend on the distribution of the electromagnetic field that propagates or is to be propagated through the device. In the case in which the electromagnetic field distribution is Gaussian, it may be best appropriate to impose this shape also to the Erbium concentration profile.

According to an embodiment, a further important reduction of optical losses may be obtained, by management of the related thermal budgets, by favoring a dense population of silicon nanocrystals in a core array film, for example, of sub-stoichiometric silicon oxide, limitedly and/or selectively in the optically active portion of the thin low refractive index core layer of the waveguide doped with Erbium. Indeed, silicon oxide has an attenuation coefficient of an optical signal smaller than that of silicon rich silicon oxide, in which silicon nanocrystals are present.

The two silicon layers of higher refraction index, typically of polycrystalline silicon (polysilicon), are locally doped in a way to form electrically conductive plates on the surfaces of the optically active Erbium doped portion of the thin layer of low refraction index of the slot waveguide. This allows effective isolation of the electromagnetic field being transferred along the waveguide by a thick substrate of silicon oxide and a thick passivation top layer, forming an outer dielectric cladding around the guiding structure.

The fact that the silicon layers of high refraction index are undoped outside the electrically pumped region of the waveguide losses in the silicon is due to free electrons. Such an advantage would typically not be attained by using an epitaxial silicon substrate instead of interposing a thick bottom isolation oxide layer that forms an effective dielectric cladding. Plates of the silicon MOS structure on the opposite surfaces of the optically active portion of SRO+Er of the thin core layer of low refractive index may be connected through contacts commonly formed through the passivation top oxide layer to a control circuit comprising an electrical source for pumping the electro-optical device formed in the slot waveguide, and integrable in CMOS technology even on the same silicon chip.

An active structure according to the present embodiments for generating an optical signal, formed in a defined portion of the waveguide, achieved propagation of the optical signal through the silicon integrated waveguide with propagation losses smaller than 8 dB/cm at 1.54 µm wavelength. The structure simplifies integration of electroluminescent devices and devices of optical amplification in optical on-chip and intrachip interconnections. The invention is defined in the annexed claims.

BRIEF DESCRIPTION OF THE DRAWINGS

FIG. 4 show graphs of operation of a slot waveguide with vertical confinement of the transversal electro-optical mode, respectively.

FIG. 5 is a graph of operation of a slot waveguide with horizontal confinement of the transversal magneto optical mode.

FIG. 6 is a schematic sectional view of the active region for generating the optical signal, integrated on silicon and electrically pumped according an exemplary embodiment.

FIG. 7 is a schematic layout of a test structure of an integrated electroluminescent device in a slot waveguide according to exemplary embodiment.

FIGS. 17 to 26 illustrate the main steps of a fabrication process of the device of this disclosure.

DETAILED DESCRIPTION OF THE PREFERRED EMBODIMENTS

Figure 1:
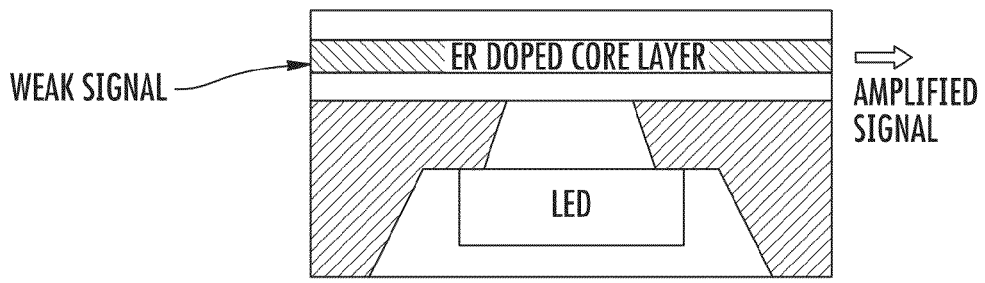
FIG. 1 is a diagram of a slot waveguide optical amplifier with a pumping LED in accordance to the prior art.
Figure 2:
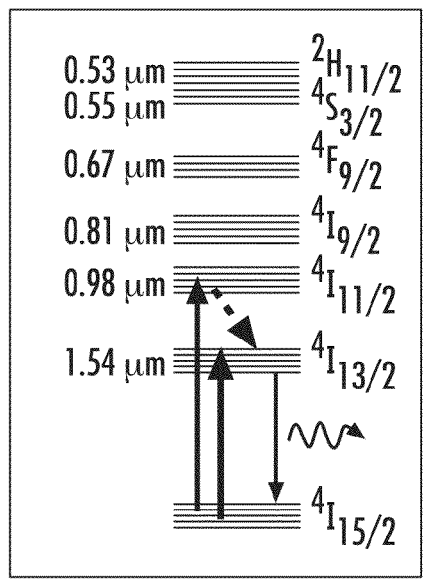
FIG. 2 illustrates a diagram of the energy levels of Erbium.
Figure 3:
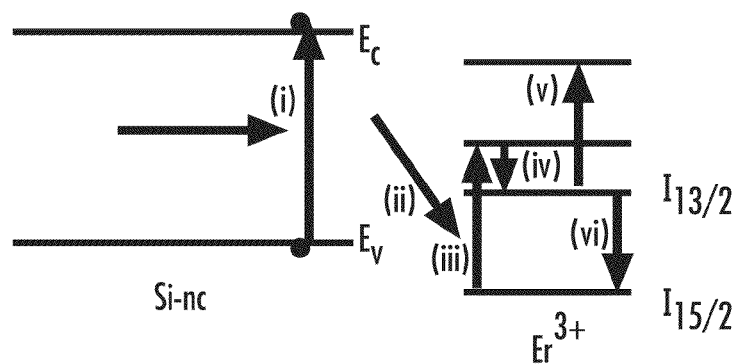
FIG. 3 illustrates a diagram of a possible excitation model of Erbium.

Exemplary embodiments will be now described only for illustration purposes, referring to the attached drawings. The proposed exemplary geometries, fabrication process flow and parameters that may be used for practicing the invention may be different and may be chosen by the designer depending on preferences and specific needs of the application. Therefore, the invention is not limited to the herein illustrated and described exemplary embodiments.

According to an embodiment, the electroluminescent device comprises a slot waveguide formed of a thin layer of silicon oxide having a relatively low refraction index and thickness smaller that 70 nm, and more preferably 50 nm, between a bottom and a top layer of silicon of a relatively higher refraction index, both of a thickness that may range between 150 nm and 300 nm. At least a portion (tract) between undoped portions of the thin core layer of silicon oxide of the waveguide in the propagation direction of an optical signal, is doped with Er and includes silicon nanocrystals.

The silicon oxide of the thin core layer may be a sub-stoichiometric oxide and/or eventually implanted with silicon atoms in the active portion, such that after one or more annealing steps, nanoclusters of silicon atoms be formed that progressively organize themselves in silicon crystals uniformly distributed in the amorphous oxide bulk (SRO+Er). When forming an optical amplifier, the undoped portions of the thin core layer of silicon oxide of the guiding structure formed the input and output medium of the optical amplifier integrated in the passive waveguide.

As an alternative, in the passive portions, the material of the thin core layer of low refractive index may be stoichiometric oxide and solely in the active portion. The oxide is enriched with silicon, for example, by implanting silicon ions in the oxide through the opening of photomask corresponding to this region at different kinetic energies and fluences in order to form non-oxidized silicon atom nanoclusters that by annealing create uniformly distributed nanocrystals in the oxide bulk in which Erbium may have been already implanted. Alternatively, the material of the thin core layer of low refractive index of the "slot" waveguide may be silicon nitride or oxy-nitride instead of silicon oxide.

On the two faces of the active portion of the thin core layer of the guiding structure, in the example SRO+Er, doped regions of the two silicon layers are defined, doping them for example with Arsenic and/or with a different dopant such as Boron and/or Phosphorus, to give silicon an electric conductivity sufficient to constitute conductive plates electrically coupled to the layer of SRO+Er therebetween, with which they form a MOS structure adapted to electrically pump the electroluminescent device. The doping of these silicon layers, carried out in the pumping region only, does not increase absorption losses in the passive regions of the waveguide. The silicon layers of high refraction index may be amorphous, micro-crystalline or poly-crystalline depending on the thermal budget and on the deposition technique of the layers.

In case the device should be used as an optical signal amplifier, doping steps should be carefully carried out because the optical characteristics of the active portion of the guiding structure as far as the effective impact cross-section of Erbium ions is concerned, influence absorption and as a consequence the resulting gain of the optically active structure. Therefore, these parameters should be optimized through a trial-and-error trimming of the processing conditions.

FIGS. 6 and 7 show a front sectional view of the active region for generating the optical signal and the layout of the structure of the exemplary embodiment of an integrated, electrically pumped integrated electroluminescent device. The structure is formed on a dielectric isolation layer 2 from the substrate monocrystalline silicon 1, that may be of silicon oxide from 2 µm to 3 µm thick, thermally grown over the surface of the silicon wafer 1. The isolation layer 2 effectively decouples the optical mode from the silicon substrate 1 (lower isolation).

The slot waveguide structure may comprise a first layer of amorphous silicon of thickness ranging between 150 µm and 300 µm, preferably of 250 nm, deposited onto the bottom insulation layer 2. A portion of the polysilicon layer is implanted with a dopant appropriate to give the silicon adequate conductivity, preferably with Arsenic at a dose of about $1E14/cm^2$. Along longitudinal borders of the first implanted area 3a, the polysilicon is preferably further enriched with dopant, for example, by performing a second implantation of Arsenic of the same dose, for increasing the conductivity of the polysilicon layer along the side portions 3b of what form a first plate of a MOS structure, eventually connected to an electrical voltage source.

The doses for doping the layer of amorphous silicon may range from $1E12/cm^2$ to $1E15/cm^2$. In the laboratory test sample, the active layer of the core of the "slot" waveguide is a layer of about 50 nm of silicon oxide or sub-stoichiometric silicon oxide (SiOx), deposited upon the polysilicon, and in which the formation of silicon nanocrystals is induced by annealing. In the active region 4, the oxide rich of silicon nanocrystals is implanted with Erbium in a dose that generally ranges between 1E13 and $1E15/cm^2$, preferably of about $1E20/cm^3$ throughout the thickness of 50 nm of the active means or layer. It is important to check the thicknesses of the layers, the composition, and the doping levels. In particular, the implanted Erbium concentration should not be such to create macroscopic clusters of Erbium ions.

Moreover, as recalled above, in case the device should be used as an optical waveguide amplifier, to obtain a gain condition it may be desirable to attain the inversion of the population of Erbium ions. Enrichment Erbium is introduced in the active region 4 of the slot waveguide either by single implantation for obtaining a Gaussian shape distribution, or by multiple implantations at different energy and fluences to obtain a uniform distribution across the thickness of the thin core film. The choice will generally be made to best match the propagation profile of the electromagnetic wave with the Erbium distribution in the array. According to a preferred embodiment, silicon enrichment is also created exclusively in the active region 4 by implanting silicon through a photomask with a concentration of about $1E20/cm^3$, such to localize the formation of silicon nanocrystals in the oxide matrix by repeated annealing steps only in this region.

The waveguide structure comprises a second silicon layer 5 having characteristics similar to those of the first layer 3, deposited on the thin core layer 4 and that is similarly implanted with a dopant solely in the active area, to constitute the second plate of the MOS structure for electrically pumping the electroluminescent device. As may be observed in the sectional view of FIG. 6, the second layer 5 of locally doped polysilicon, the layer of SRO 4, locally doped with Erbium and partially also the first layer 3 of locally doped polysilicon (3a and 3b) are defined for a certain width of the waveguide, thus realizing the guiding structure over the thick isolation layer 2 of oxide. Preferably, the first level polysilicon is not completely etched. On the contrary, laterally, outside the geometrical projection of the portion 3a overlaying the active layer (SRO+Er) of the guiding structure, a layer 3b of reduced thickness is left, coinciding with regions of doped polysilicon further enriched of dopant, on which metal contacts 8 are formed, together with contacts 7 of the top plate 7 for electrically connecting the lower plate through a thick layer of passivating dielectric silicon oxide 6 (top isolation).

The layer 4 of SRO+Er of the active region of the slot waveguide has a smaller refraction index than the refraction index of the polysilicon layers 3 and 5, and this increases the electrical field strength perpendicular to the interfaces. This effect is verified for the transverse mode (TM) polarization of the guided or radiative modes and induces in turn an increased light emission by excited Erbium ions.

The structure of the electrically pumped electroluminescent waveguide device has been tested for different electro-optical characteristics of the constituting films and geometries and the influence of the geometrical parameters W (width of the waveguide (RIB)), h (etching stack poly/SRO/poly), H (height stack poly/SRO/poly) on mono-modality (Olympios-C2V) has been studied. Optical simulation carried out with the Olympias software gave purely geometrically natural indirections. All simulations have been carried for the wavelength of interest, $\lambda_s = 1540$ nm.

Figure 8:
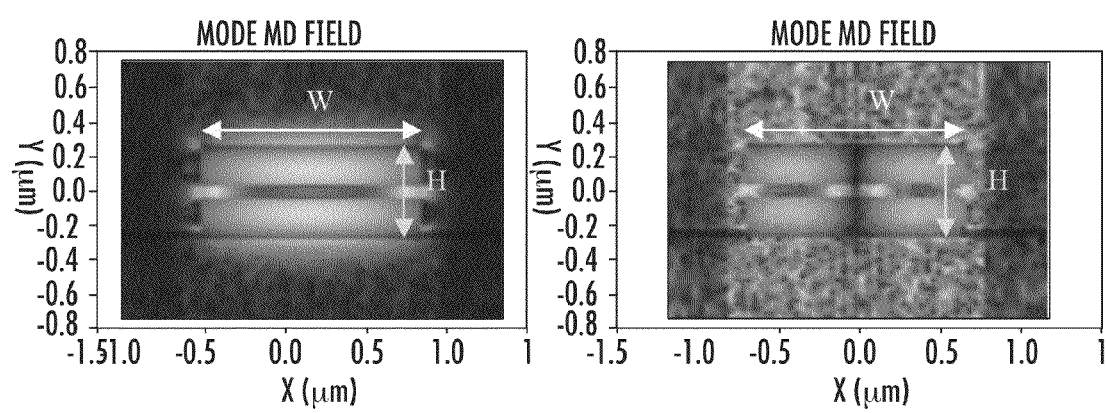
FIG. 8 is a graph of the zero-order magnetic transversal mode within the guiding structure according to an exemplary embodiment.

In FIG. 8 it may be observed that the magnetic zero-order transverse mode is well confined within a guide of width W=1.2 µm, and upper orders are not confined. To satisfy the condition of mono-modality, it may be sufficient that the width of the waveguide be of 1.2 µm or less, thus technologically easy to be implemented in a CMOS process.

Figure 9A:
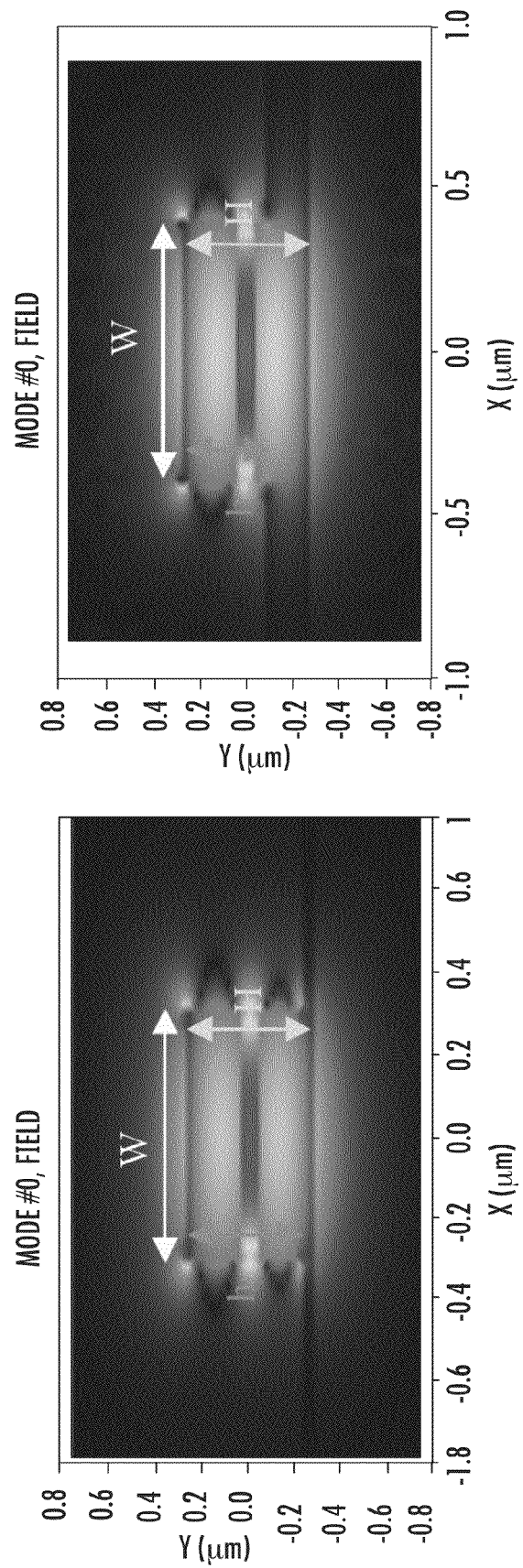
FIGS. 9A-9B illustrate the effect of the residual polysilicon along the sides of the guiding structures on the mode propagation.
Figure 9B:
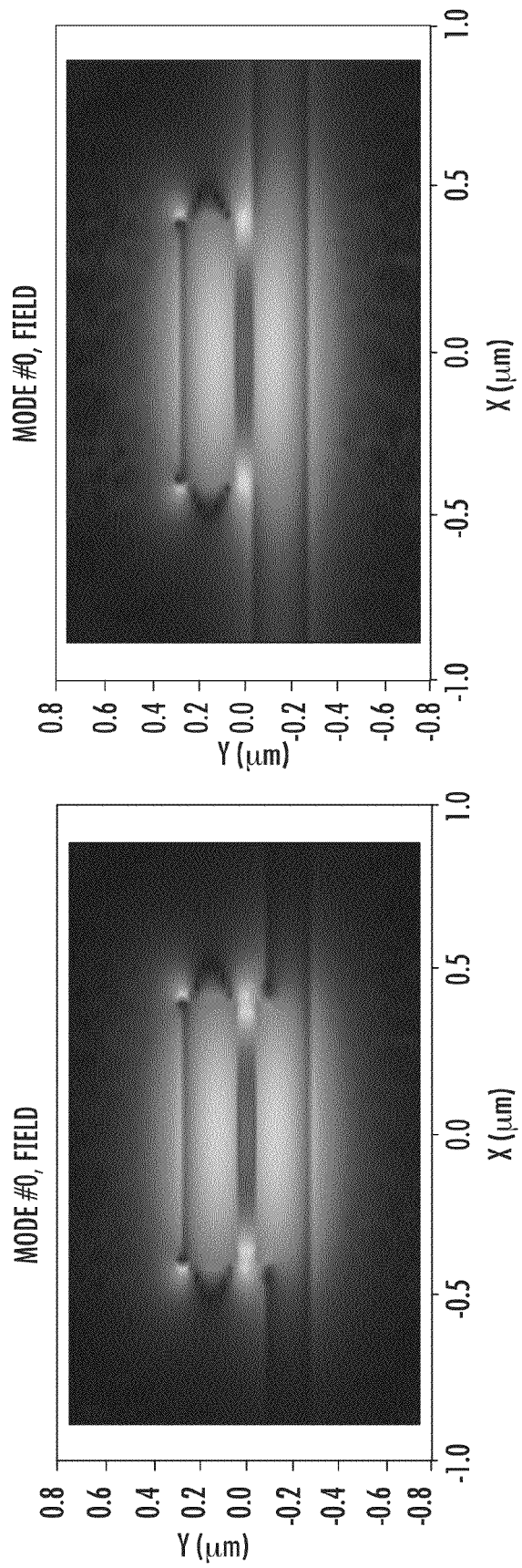

In contrast, a more difficult process step is the controlled etching of the stack poly-up/SRO/poly-bottom. Indeed, a controlled partial etching of the bottom polysilicon (poly-bottom 3a, 3b) is difficult. To evaluate the effect on the mode propagation of residual polysilicon along the sides of the guiding structure, structures as depicted in FIGS. 9A-9B have been simulated, characterized by different thicknesses of the bottom polysilicon layer alongside the geometrical projection of the optically active portion of the layer 4 (SRO+Er).

From the simulation results, it could be inferred that the main transversal magnetic mode retains its confinement and mono-modality characteristics, even if the bottom polysilicon layer is not etched or is only partially etched. It is even possible to etch only the stack poly-up/SRO. The influence of an eventual etch of the poly-bottom on the mode has been evaluated in the fourth and last simulation.

To implement an effective electrical pumping, the polysilicon of the two plates 3a and 5 should be doped to force a current across the optically active medium 4 of SRO+Er. Dopant implants of the polysilicon layers have been studied for reducing absorption losses by free electrical carriers and at the same time ensure increased uniformity (plate equipotentiality) of the electric pumping and a increased electrical contact with the optically active layer of SRO+Er. In correspondence of the active region where the main optical mode is confined, the dopant concentration of the silicon layers of higher refractive index should be as small as possible, provided it is sufficient to ensure a increased equipotentiality and uniformity of electric contact, to reduce excessive optical absorption. In the side contact zone (off the geometrical projection of the waveguide), the doping may be increased because it has a negligible influence on optical absorption. Moreover, a heavier doping would contribute to confine the electromagnetic field in the region of a lighter doping.

A test has been carried out by carrying out partial implantations and diffusions of the dopant in succession as described hereinafter. The objective was to obtain, for a 250 nm thick layer of polysilicon, a resistivity of about 60 mΩ cm (1E16-1E17 atoms/cm$^3$) to ensure a relatively small absorption coefficient in the optically active zone.

Figure 10:
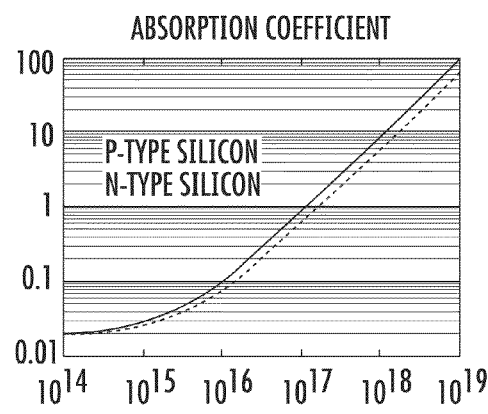
FIG. 10 is an absorption graph of the P type and of N type silicon versus implantation dose.
Figure 11:
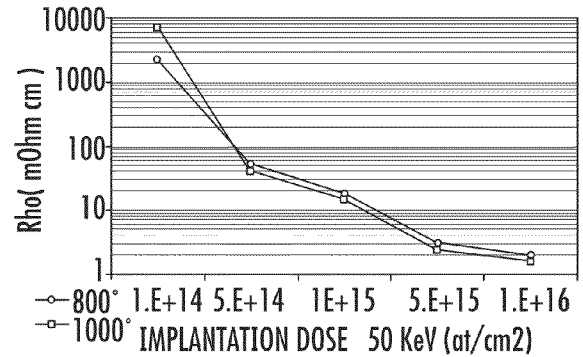
FIG. 11 is a graph of resistivity of P type and of N type silicon versus implantation dose.

FIGS. 10 and 11 illustrate the absorption and resistivity characteristics of type P and type N silicon versus the cumulative implantation dose. An implantation dose of about 5E14 atoms/cm$^2$ at 50 keV ensures a concentration sufficient to provide for electric contact and avoid the sensible absorption phenomena, whether a diffusion/activation treatment at 800° C. or at 1000° C. is performed. With this dose, the resistivity values ranged between 1000 and 10000 mΩ cm, for the different thermal budget and the corresponding absorption coefficient was about ≤10 cm$^{-1}$. In general, the optimum concentration would be the minimum concentration for which a satisfactory ohmic contact is provided.

In order to form a first prototype of electroluminescent device, a set of six level masks as described in A. Raffa, R. Guerra, Progettazione del set di maschere RAMSES per modulatori elettro-ottici a Plasma Effect e interferometri Mach-Zehnder (Technical Report TR_7083_2004) [14 Jul. 2004], has been used, with the parameters indicated in the following table.

The size of the layout was 22000×22000 μm.

TABLE 1

| PARAMETER | VALUES IN μm |
|---|---|
| Rib width (W) | 10; 8 |
| Length of the active portion (L) | 100; 250; 500; 1000; 2000; 3000; 5000; 7000 |
| Distance of the Boron implantation profile from the rib (dImp) | 0.5; 1; 1.5 |
| Distance of the gate contact from the rib (dCont) | 1.5; 3; 5 |
| Width of the gate contact (C) | 10; 15; 20 |
| Distance metal gate-source (MtlG-S) | 2; 2.5 |

Figure 12:
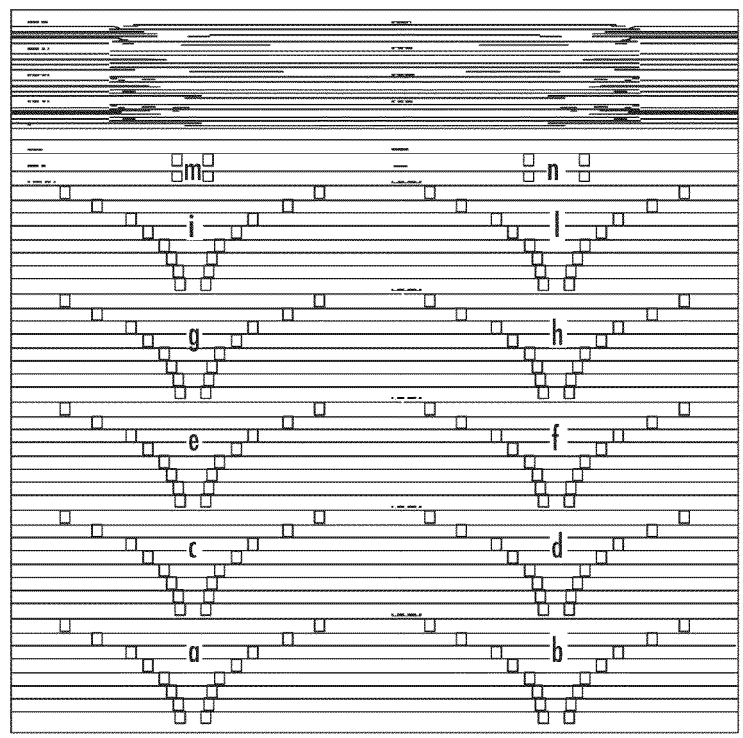
FIG. 12 depicts a set of six level masks used for realizing the test prototype.

Each device differs from the other by at least a geometrical parameter. In the field of each series, depicted in FIG. 12 with letters from a to n, the differences among the devices are in the length of the active portion, that increases from bottom to top assuming the values indicated in Table 1 (100-7000 μm). Different lengths of the active region may permit evaluation of optical gain in case an optical amplifier should be formed.

An optical waveguide amplifier of such limited length would hardly be efficient because absorption losses will still be greater than the gain. Indeed, no net gain should be observed up to a 7000 μm length.

The considered width of the waveguide W (RIB) was 8 or 10 μm. As previously stated, to have monomodality, the width should be less than 1.2 μm. Nevertheless, even for such excessively large slot waveguides of the test samples, the mode was confined and useful processing information could be acquired, as well as geometrical and electrical information that will allow the design of new test chips based on the knowledge acquired from the first prototypes.

The geometrical parameters, expressed in μm, that characterize the various series of masks used (FIG. 12) indicated with the letters from a to l are given in the following table.

TABLE 2

| | W | dImp | dCont | MtlG-S | MTL width Source | Gate |
|---|---|---|---|---|---|---|
| a | 8 | 1 | 3 | 2 | 6 | 20 |
| b | 10 | 0.5 | 3 | 2.5 | 7 | 20 |
| c | 10 | 1 | 3 | 2.5 | 7 | 20 |
| d | 10 | 1.5 | 3 | 2.5 | 7 | 20 |
| e | 10 | 0.5 | 1.5 | 2.5 | 7 | 18.5 |
| f | 10 | 1 | 1.5 | 2.5 | 7 | 18.5 |
| g | 10 | 1.5 | 1.5 | 2.5 | 7 | 18.5 |
| h | 10 | 0.5 | 5 | 2.5 | 7 | 22 |
| i | 10 | 1 | 5 | 2.5 | 7 | 22 |
| l | 10 | 1.5 | 5 | 2.5 | 7 | 22 |

Geometrical parameters (expressed in micrometers) characterizing the modulators of the series indicated with the letters m, n (FIG. 12) are given in the following table.

TABLE 3

| | W | dImp | dCont | C | L |
|---|---|---|---|---|---|
| m | 10 | 1 | 3 | 10-20 | 250 |
| n | 10 | 1 | 3 | 10-20 | 1000 |

Figure 13:
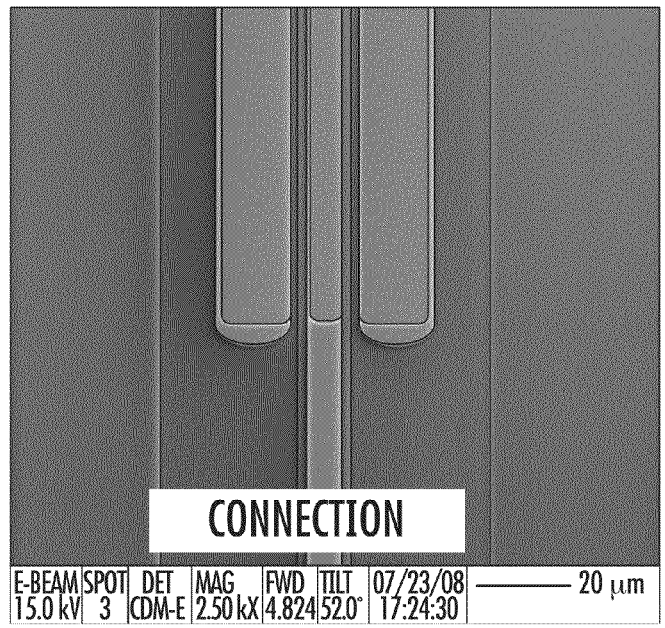
FIG. 13 is a plant SEM view of the prototype of the novel silicon electroluminescent device.
Figure 14:
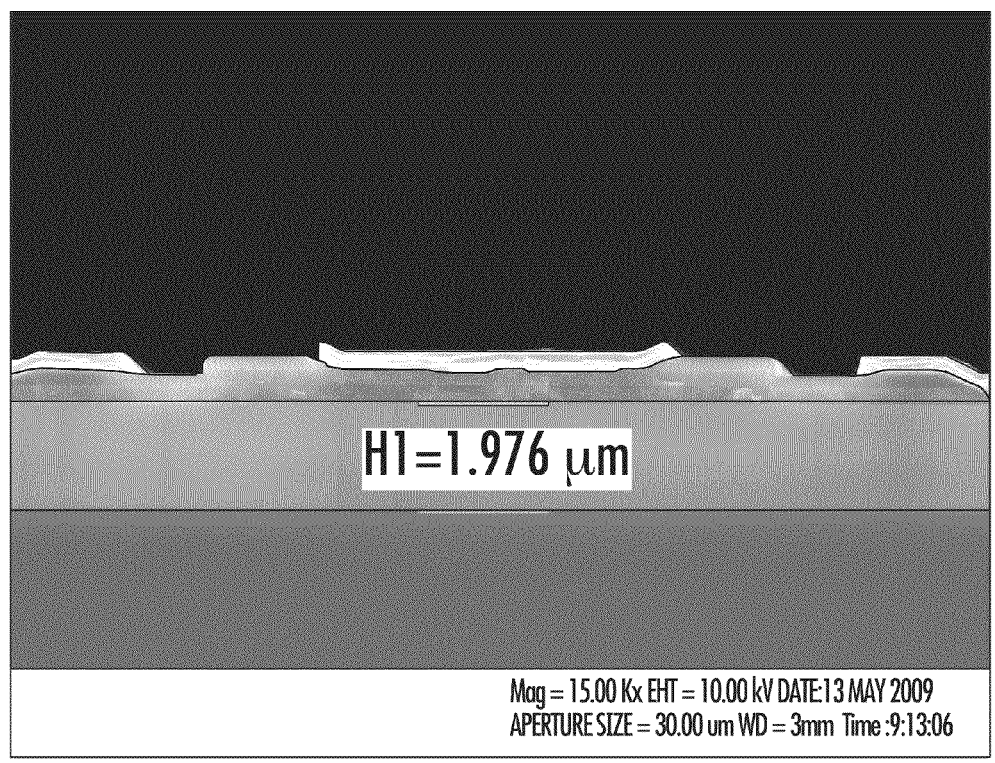
FIG. 14 is a sectional SEM view of the electro-optically active region of the device.

Two batches were prepared, namely Y828212 and Y828213 for making the prototype test structures. From the layout SEM picture of FIG. 13, the etching of the waveguide (RIB) and the metal vias may be observed. In the sectional SEM picture of FIG. 14, the thicknesses of the different layers that form the active device, the transversal size, and the etching profiles may be observed.

Figure 15:
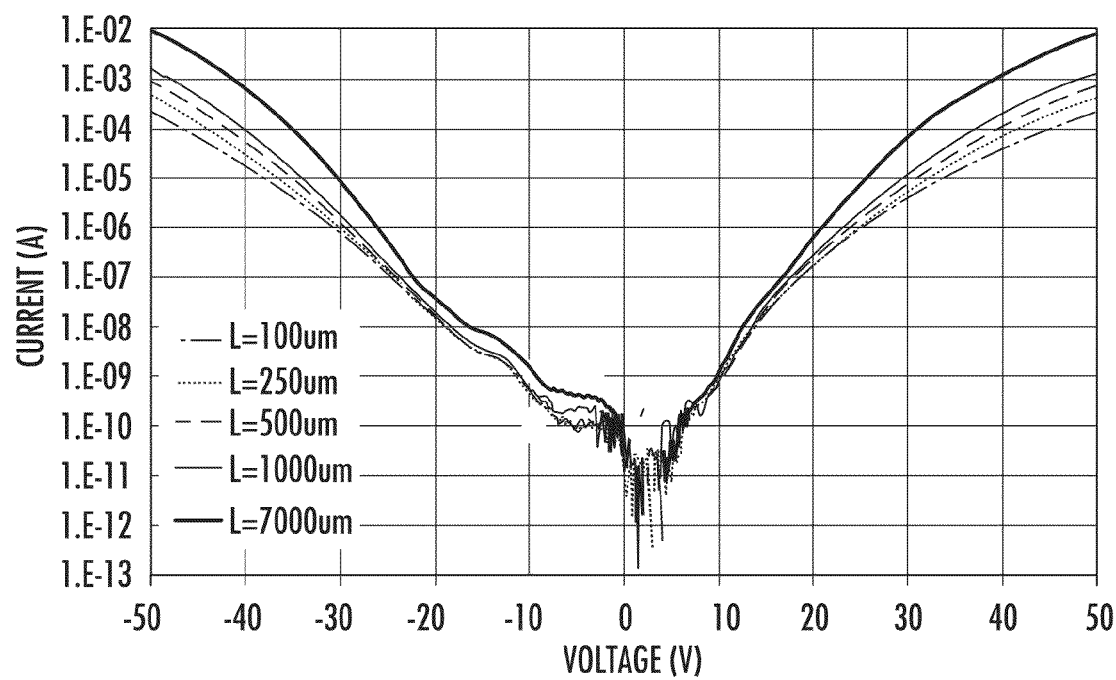
FIG. 15 shows the voltage-current characteristics through the MOS structure of electrical pumping of the novel optical device in a silicon integrated waveguide.

The voltage-current characteristics obtained for the various test devices and illustrated in FIG. 15, are relative to a core film of the "slot" waveguide of SRO doped with Erbium, across which a pumping voltage from −50 VDC up to +50 VDC is applied and the corresponding values of electric current that is forced through the optically active core layer (SRO+Er) in the region of light generation of the waveguide. The pumping current ranged from 1E-09 A to several mA.

Figure 16:
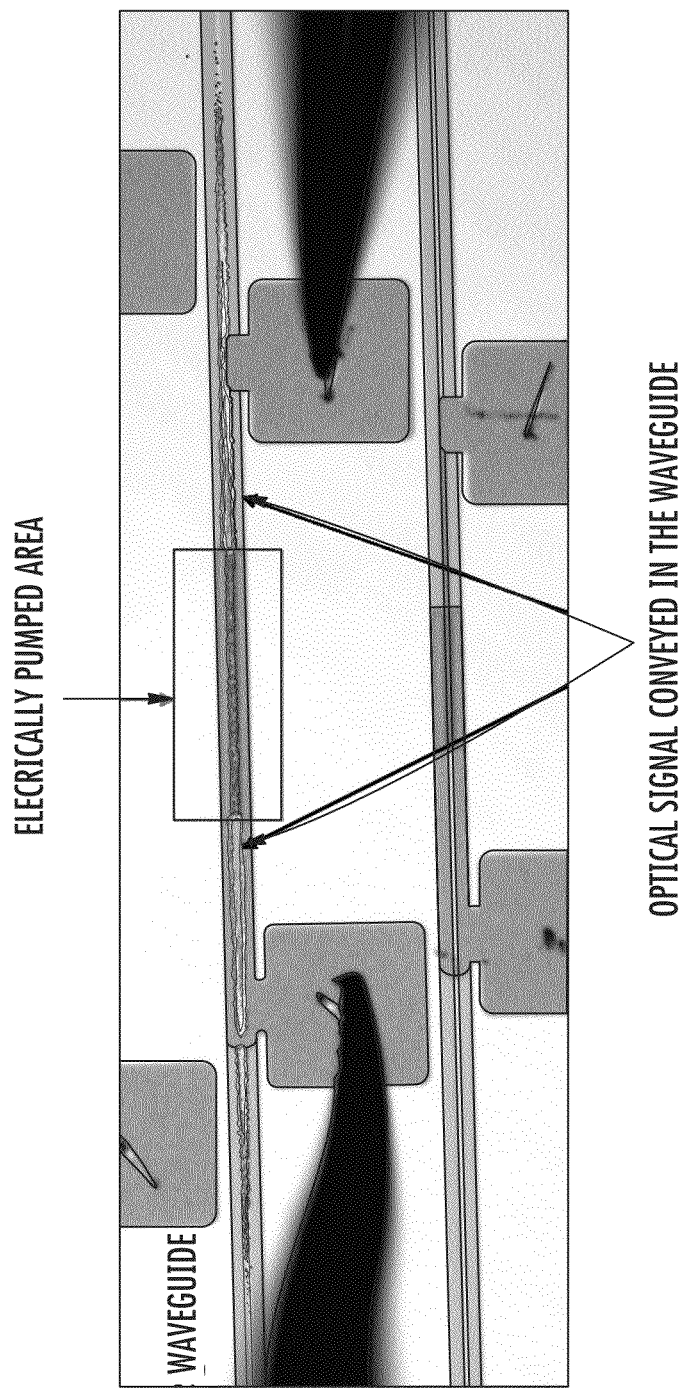
FIG. 16 is an EMMI image of the optical device during its functioning with electrical pumping.

In the EMMI image of FIG. 16, the electrically pumped generation region and the optical signal conveyed in the waveguide may be observed. The generated light is transmitted symmetrically in the two passive portions of the waveguide. Should transmission of the generated light only in a branch be desired, it may be sufficient to integrate a common Bragg reflector (DBR) in the branch of the guide to be blinded.

With reference to the sequence of schematic illustrations of the series of FIGS. 17-26, an exemplary "CMOS-compatible" process flow will now be described for forming the electrically pumped Erbium doped electroluminescent device in a passive waveguide. The process flow described hereinbelow is an example of fabrication process of the device of that implies integration in the process flow of Erbium implantations through the openings of a resist mask, the layout of which is associated to the related cross sectional view of the article being manufactured.

With reference to FIG. 17 the following steps are performed: superficial polishing of the substrate silicon wafer (1) is performed followed by growing of bottom insulation thermal oxide (2) of the electromagnetic field (minimum 2 µm). The process further includes deposition of a bottom amorphous polysilicon layer (3) (250 nm), and performing a first masking for aligning the next masks.

In FIG. 18, the process continues by applying a photomask for doping the polysilicon, for example, with As $1E15/cm^2$ at 50 keV (3a) is performed; and in FIG. 19 photomasking is performed for enriching the contacts, for example, with As $1E15/cm^2$ at 50 keV (3b) is performed. A superficial polishing of silicon is also performed.

Referring to FIG. 20, the following steps are performed: deposition or growing of the active matrix layer of the core (4) of sub-stoichiometric silicon oxide (50-70 nm); and doping the photomask for the film of silicon oxide of the slot (4) with Erbium in a dose preferably ranging between $2.5E14/cm^2$, 50 keV. Eventually, a multiple implantation at different energies is carried out for obtaining a uniform concentration of optical dopant in the optically active means or layer. The silicon surface is polished.

In FIG. 21, the top layer of amorphous polysilicon (5) (250 nm) is deposited, followed by annealing, at about 800° C., for activating the active means or layer, and forming silicon nanocrystals in the amorphous array of silicon oxide.

Figure 22:
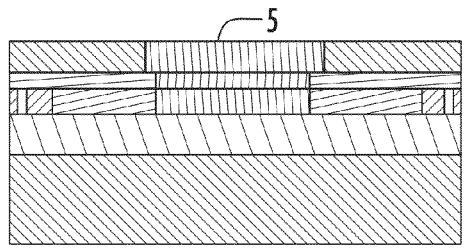

Referring to FIG. 22, the process includes photomasking for doping the polysilicon (5), for example, with As $1E15/cm^2$ at 50 keV is performed, followed by a thermal process for activating the dopant of polysilicon preferably at about 1025° C.

Figure 23:
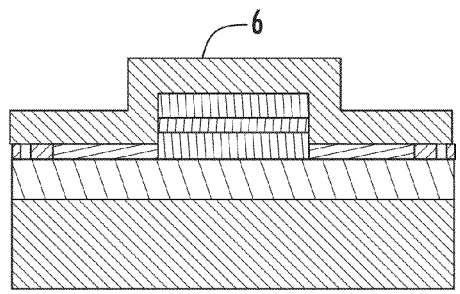

In FIG. 23, a photomasking and dry etching of the stack comprising the top polysilicon+SRO to define the rib structure of the waveguide are performed. A top passivation layer of silicon oxide (6) is deposited.

Figure 24:
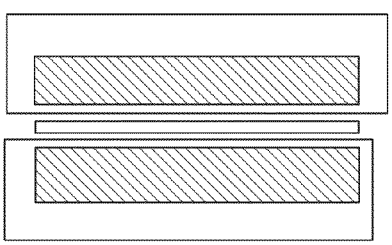
Figure 24:
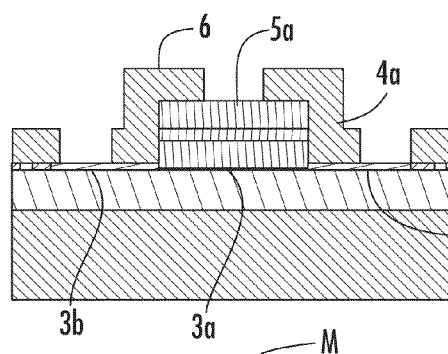
Figure 25:
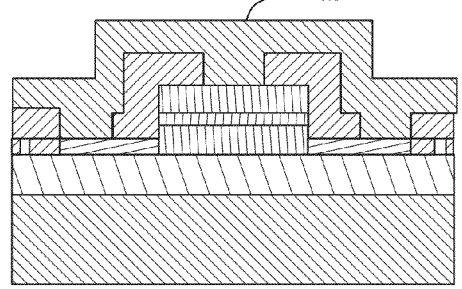
Figure 26:
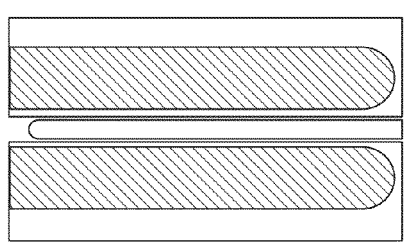
Figure 26:
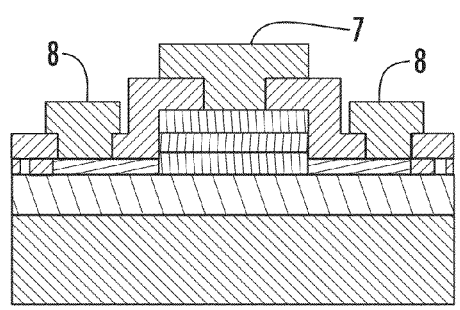

In FIG. 24 photomasking and definition of the contacts are performed, in FIG. 25, metal sputtering is performed, and in FIG. 26, the process includes a photomasking and metal definition followed by a thermal stabilization process that results in the eventual reduction of the thickness of the silicon wafer and the metalization of the rear of the silicon wafer.

The process flow is integrable in a fabrication process of CMOS devices allowing for the formation of control and pump circuitry of the electroluminescent device, and of complex electro-optical signal paths on a same chip.

According to the preferred embodiment, the same implantation mask of Erbium may be used also for implanting silicon ions in the active zone of a core layer of silicon oxide for creating through annealing steps silicon monocrystals in the oxide bulk. Also in this case, implantation may be single or multiple depending on whether a Gaussian or a different concentration profile of silicon nanocrystals is preferred (as for the implanted Erbium atoms). In this way, the optical losses along the passive portions of the light guiding structures may be further reduced, especially if an optical amplifier is to be formed by increasing the net optical gain of the waveguide device.

That which is claimed:

1. An electrically pumped lateral emission electroluminescent device comprising:
   a slotted waveguide comprising
      a top silicon layer having a thickness between 150 nm and 300 nm and a top layer refraction index associated therewith,
      a bottom silicon layer having a maximum thickness between 150 nm and 300 nm, a bottom layer refraction index associated therewith, and a reduced thickness portion, and
      a core layer comprising silicon oxide between said top and bottom silicon layers and having a core layer refraction index associated therewith and a thickness less than 70 nm, the core layer refraction index being greater than each of the top and bottom layer refraction indices,
      at least one portion of said core layer being in a direction of light propagation and being doped with erbium, and comprising silicon nanocrystals,
      at least one portion of each of said top silicon and bottom silicon layers being electrically conductive and vertically aligned with the at least one portion of the core layer, and the at least one portion of said top silicon layer defining a top electrode of a metal oxide semiconductor (MOS) structure to be coupled to a direct current (DC) electrical source;
      the reduced thickness portion of said bottom silicon layer extending laterally from said vertically aligned at least one portion of each of said top and bottom silicon layers to define at least one bottom electrode of the MOS structure to be coupled to the DC electrical source.

2. The device according to claim 1, further comprising a silicon substrate and an isolation layer comprising silicon oxide carried by said silicon substrate, said silicon oxide isolation layer having a thickness greater than 1 um, and wherein said core layer and said top silicon layer are configured to define a width of said slotted waveguide.

3. The device according to claim 2, further comprising metal contacts configured to contact said top and bottom electrodes through said silicon oxide isolation layer.

4. The device according to claim 3, wherein said bottom silicon layer has, corresponding to the reduced thickness portion, a greater dopant concentration than a dopant concentration corresponding to a coupling area with said core layer.

5. An electroluminescent device comprising:
   a top layer comprising silicon and having a top layer refraction index associated therewith;
   a bottom layer comprising silicon and having a bottom layer refraction index associated therewith and having a reduced thickness portion; and
   a core layer comprising silicon oxide between said top and bottom layers and having a core layer refraction index associated therewith, the core layer refraction index being greater than each of the top and bottom layer refraction indices;
   at least one portion of said core layer being doped with erbium and comprising silicon nanocrystals;
   at least one portion of each of said top and bottom layers being electrically conductive and vertically aligned with the at least one portion of the core layer, and the at least one portion of said top layer defining a top electrode;
   the reduced thickness portion of said bottom layer extending laterally from the vertically aligned at least one portion of each of said top and bottom layers to define at least one bottom electrode.

6. The device according to claim 5, further comprising a silicon substrate and an isolation layer comprising silicon oxide carried by said silicon substrate, said isolation layer having a thickness greater than or equal to 1 µm.

7. The device according to claim 6 further comprising metal contacts configured to contact said top and bottom electrodes through said isolation layer.

8. The device according to claim 7, wherein said core layer has a coupling area defined therein, and wherein the reduced thickness portion of said bottom layer has a greater dopant concentration than a dopant concentration of the coupling area.

9. The device according to claim 5, wherein said top layer has a thickness between 150 nm and 300 nm.

10. The device according to claim 5, wherein said bottom layer has a maximum thickness between 150 nm and 300 nm.

11. The device according to claim 5, wherein said core layer has a thickness less than or equal to 70 nm.

\* \* \* \* \*